United States Patent
Khatri et al.

(10) Patent No.: US 11,983,276 B2
(45) Date of Patent: *May 14, 2024

(54) COMMUNICATION SYSTEM PERSONALITY PROVISIONING SYSTEM

(71) Applicant: Dell Products L.P., Round Rock, TX (US)

(72) Inventors: Mukund P. Khatri, Austin, TX (US); Jimmy D. Pike, Georgetown, TX (US); Gaurav Chawla, Austin, TX (US); William Price Dawkins, Lakeway, TX (US); Elie Jreij, Pflugerville, TX (US); Mark Steven Sanders, Fayetteville, AR (US); Walter A. O'Brien, III, Westborough, MA (US); Robert W. Hormuth, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,226

(22) Filed: Oct. 27, 2022

(65) Prior Publication Data
US 2023/0049895 A1 Feb. 16, 2023

Related U.S. Application Data

(63) Continuation of application No. 17/029,409, filed on Sep. 23, 2020, now Pat. No. 11,500,994.

(51) Int. Cl.
*G06F 9/24* (2006.01)
*G06F 8/61* (2018.01)
(Continued)

(52) U.S. Cl.
CPC ............ *G06F 21/575* (2013.01); *G06F 8/63* (2013.01); *G06F 9/547* (2013.01); *G06F 21/44* (2013.01);
(Continued)

(58) Field of Classification Search
CPC .......... G06F 21/575; G06F 8/63; G06F 9/547; G06F 21/44; G06F 21/572;
(Continued)

(56) References Cited

U.S. PATENT DOCUMENTS 7,124,322 B1 * 10/2006 Backman ............ G06F 11/1464
714/15
10,831,897 B2 * 11/2020 Khatri ................... H04L 9/3247
(Continued)

*Primary Examiner* — Volvick Derose
(74) *Attorney, Agent, or Firm* — Joseph Mencher

(57) ABSTRACT

A communication system personality provisioning system includes a communication system included in a computing system and coupled to a management system. The communication system stores authentication information in a UEFI database of a UEFI system in the communication system. The communication system receives a first operating software image and application/service from the management system, authenticates the first operating software image and application/service via first secure initialization operations performed by the UEFI system using the authentication information and, in response, installs the first operating software image and application/service on the communication system. The communication system subsequently receives a second operating software image and application/service from the management system, authenticates the second operating software image and application/service via second secure initialization operations performed by the UEFI system using the authentication information and, in response, installs the second operating software image and application/service on the communication system.

20 Claims, 12 Drawing Sheets

(51) Int. Cl.
*G06F 9/54* (2006.01)
*G06F 21/44* (2013.01)
*G06F 21/57* (2013.01)
*H04L 9/30* (2006.01)
*G06F 9/4401* (2018.01)
*G06Q 10/10* (2023.01)
*G06Q 30/018* (2023.01)

(52) U.S. Cl.
CPC .............. *G06F 21/572* (2013.01); *H04L 9/30* (2013.01); *G06F 9/4401* (2013.01); *G06F 2221/033* (2013.01); *G06Q 10/10* (2013.01); *G06Q 30/0185* (2013.01)

(58) Field of Classification Search
CPC ... G06F 2221/033; H04L 9/30; H04L 9/3263; H04L 9/0894; G06Q 10/10; G06Q 30/0185
USPC ............................................................ 713/2
See application file for complete search history.

(56) References Cited

U.S. PATENT DOCUMENTS

| | | | | |
|---|---|---|---|---|
| 2010/0146634 A1* | 6/2010 | Choi | G06F 21/57 | 726/26 |
| 2011/0296404 A1* | 12/2011 | Zhang | G06F 8/658 | 717/178 |
| 2012/0054734 A1* | 3/2012 | Andrews | G06F 8/65 | 717/171 |
| 2012/0266259 A1* | 10/2012 | Lewis | G06F 21/51 | 726/30 |
| 2014/0143770 A1* | 5/2014 | Oberai | G06F 8/63 | 717/174 |
| 2014/0230024 A1* | 8/2014 | Uehara | H04L 63/1433 | 726/4 |
| 2015/0074387 A1* | 3/2015 | Lewis | G06F 21/575 | 713/2 |
| 2015/0089209 A1* | 3/2015 | Jacobs | G06F 21/575 | 713/1 |
| 2015/0347151 A1* | 12/2015 | Takefman | G06F 9/4411 | 713/2 |
| 2016/0004539 A1* | 1/2016 | Kawano | G06F 9/441 | 713/100 |
| 2016/0103693 A1* | 4/2016 | Berlin | G06F 9/4411 | 719/327 |
| 2016/0150155 A1* | 5/2016 | Kapinos | H04N 23/611 | 348/231.6 |
| 2016/0378970 A1* | 12/2016 | Campbell | G06F 21/575 | 726/17 |
| 2017/0230185 A1* | 8/2017 | Varadhan | H04L 9/14 | |
| 2018/0285570 A1* | 10/2018 | Leblanc | B28C 7/024 | |
| 2018/0357108 A1* | 12/2018 | Mullender | G06F 9/45558 | |
| 2019/0080093 A1* | 3/2019 | Pirvu | G06F 9/4406 | |
| 2019/0114178 A1* | 4/2019 | Shi | G06F 9/4416 | |
| 2020/0394303 A1* | 12/2020 | Suryanarayana | G06F 21/572 | |
| 2021/0224093 A1* | 7/2021 | Fu | G06F 9/5072 | |
| 2022/0092188 A1* | 3/2022 | Khatri | G06F 21/572 | |
| 2022/0216984 A1* | 7/2022 | Liu | H04L 9/0894 | |
| 2022/0230376 A1* | 7/2022 | Rozantsev | H04N 19/537 | |
| 2022/0309143 A1* | 9/2022 | Thakur | G06F 21/606 | |

* cited by examiner

COMMUNICATION SYSTEM PERSONALITY PROVISIONING SYSTEM

CROSS-REFERENCE TO RELATED APPLICATIONS

The present disclosure is a continuation of U.S. patent application Ser. No. 17/029,409, filed Sep. 23, 2020, the disclosure of which is incorporated by reference herein in its entirety.

BACKGROUND

The present disclosure relates generally to information handling systems, and more particularly to provisioning personalities for communication systems in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as server devices and/or other computing systems have begun to implement enhanced communication systems such as, for example, Smart Network Interface Controller (SmartNIC) devices (also known as Intelligent Server Adapters (ISA) devices), which operate to offload network data path processing from central processing systems (e.g., Central Processing Units (CPUs)) in the server device. While conventional communication systems such as NIC devices operate to offload some limited networking operations (e.g., checksum operations and segmentation operations), the shift to "cloud" datacenter networking has been driven by Software Defined Networking (SDN) and Network Function Virtualization (NFV), and has spurred the development of "smart" communication systems such as the SmartNIC devices discussed above due to the increase in the complexity of the server-based networking data plane (e.g., via the introduction of overlay tunneling protocols such as the Virtual Extensible Local Area Networks (VXLAN) protocol and the use of virtual switching operations with complex actions), the increase in network interface bandwidths that require substantial portions of the central processing resources in the server device, and the fungibility requirements for SDN (which prevent the use of fixed-function offload technologies).

SmartNIC devices may perform a variety of operations for their server device such, as, for example, implementing complex server-based networking data plane functions (e.g., multiple match-action processing, tunnel termination, tunnel origination, metering, shaping, per-flow statistics, etc.), supporting a fungible data plane (e.g., through updated firmware loads or customer programming) with little to no predetermined limitations on functions that can be performed, operating with open source ecosystems (e.g., to maximize software feature velocity and leverage), performing acceleration operations, and/or performing other SmartNIC functionality that would be apparent to one of skill in the art in possession of the present disclosure. However, while SmartNIC devices provide several benefits to server devices, the use of SmartNIC devices in server devices can lead to some issues.

SmartNIC devices typically include an embedded operating system and/or hypervisor system, along with applications/services, that enable various SmartNIC capabilities that may be considered as providing a "personality" for that SmartNIC device. However, when it is desired to change the personality of a SmartNIC device by providing a different operating system and/or hypervisor system (and/or applications/services) than is current utilized by the SmartNIC device in a server device (e.g., if a SmartNIC device in the server device includes a default embedded LINUX® operating system available from the LINUX® foundation, and it is desired to provide a SmartNIC device in the server device that includes an ESXio hypervisor system available from VMWARE®, Inc. of Palo Alto, Calif., United States), issues can arise due to the firmware, the operating system and/or hypervisor system, and/or the applications/services in conventional SmartNIC devices being "owned" or otherwise controlled by the SmartNIC device provider.

For example, conventional SmartNIC devices include a communication device such as a NIC device that performs conventional network communication functionality, along with SmartNIC firmware components (e.g., a processing system and a Unified Extensible Firmware Interface (UEFI) system), a SmartNIC operating system and/or hypervisor system, and SmartNIC applications/services that operate together to perform the SmartNIC functionality discussed above to provide the personality for that SmartNIC device. In such conventional SmartNIC devices, SmartNIC security may be provided at the UEFI system layer, and the UEFI system may be locked to prevent anyone other than the SmartNIC device provider from changing the operating system and/or hypervisor system (and/or applications/services) on the SmartNIC device. As such, in order to change the operating system and/or hypervisor system (and/or applications/services) on such a SmartNIC device (e.g., when a server device manufacturer would like the SmartNIC device to perform particular functionality), the SmartNIC device provider must implement that change, which decreases the "flexibility" of the SmartNIC device.

One solution to such issues is to "open up" or otherwise remove the security at the UEFI system layer, which allows the changing of the operating system and/or hypervisor system (and/or applications/services) on the SmartNIC device by anyone that can access the UEFI system in the SmartNIC device. However, one of skill in the art in possession of the present disclosure will appreciate that removing the security at the UEFI system layer introduces a huge security risk to the SmartNIC device. Another solution to such issues is to provide multiple SmartNIC devices, one with each operating system and/or hypervisor system (and/ or applications/services), but doing so increases costs, requires corresponding Stock Keeping Units (SKUs) for each SmartNIC device personality (e.g., an SKU for the SmartNIC device with the LINUS® operating system discussed above, and an SKU for the SmartNIC device with the ESXio hypervisor system in the example above), and is accompanied by security considerations that are specific to each operating system and/or hypervisor system (in order to prevent that SmartNIC device from being a target for exploits such as Advanced Persistent Threats (APTs), malware persistence, and/or other exploits known in the art). As will be appreciated by one of skill in the art in possession of the present disclosure, as the matrix of SmartNIC device personalities and the need for multiple operating system and/or hypervisor system images grows, that increases the number of SKUs and associated SKU management requirements, which increases costs and inefficiencies in deployment.

Accordingly, it would be desirable to provide a communication system personality provisioning system that addresses the issues discussed above.

SUMMARY

According to one embodiment, a communication system includes a communication processing system; and a communication memory system that is coupled to the communication processing system and that includes instructions that, when executed by the communication processing system, cause the communication processing system to provide a communication system personality provisioning engine that is configured to: store authentication information in a Unified Extensible Firmware Interface (UEFI) database that is part of a UEFI system that is included in the communication system; receive, from a management system, a first operating software image and at least one first application/service; authenticate, via first secure initialization operations using the authentication information, the first operating software image and the at least one first application/service and, in response, install the first operating software image and the at least one first application/service on the communication system; receive, from the management system subsequent to installing the first operating software image and the at least one first application/service on the computing device, a second operating software image and at least one second application/service; and authenticate, via second secure initialization operations using the authentication information, the second operating software image and the at least one second application/service and, in response, install the second operating software image and the at least one second application/service on the communication system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
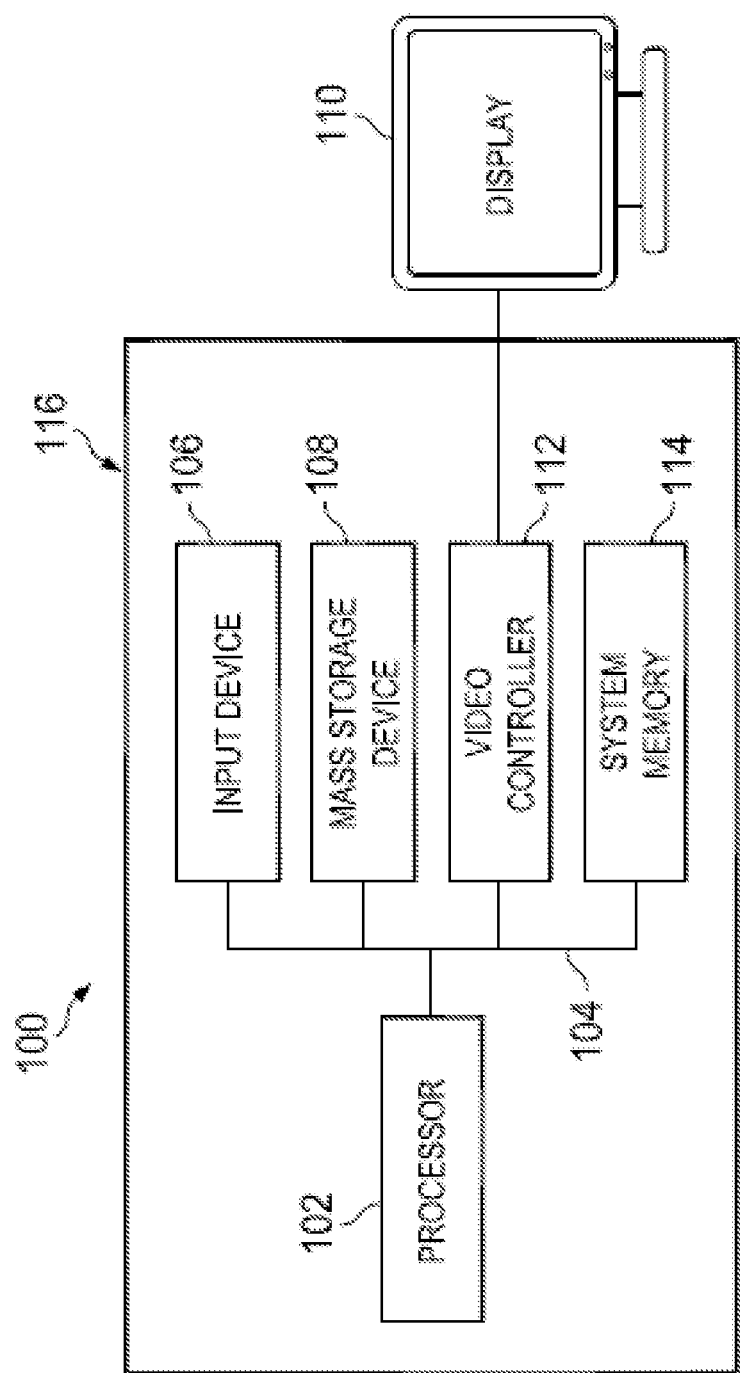
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
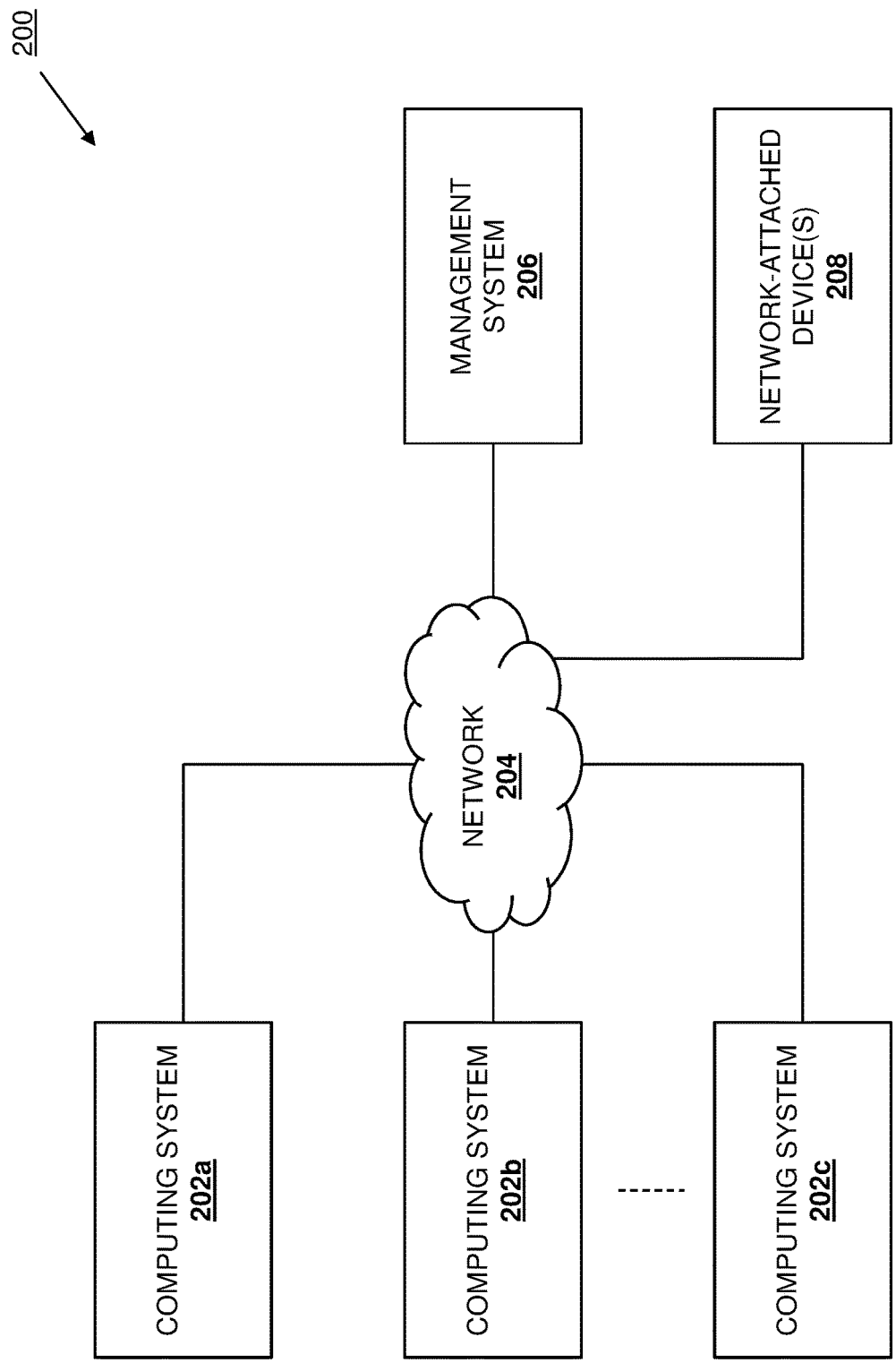
FIG. 2 is a schematic view illustrating an embodiment of a networked system.

Referring now to FIG. 2, an embodiment of a networked system 200 is illustrated in which the communication system personality provisioning system of the present disclosure may be utilized. In the illustrated embodiment, the networked system 200 includes a plurality of computing systems 202a, 202b, and up to 202c. In an embodiment, the computing system 202a-202c may be provided by the IHS 100 discussed above with reference to FIG. 1, and/or may include some or all of the components of the IHS 100, and in specific examples may be provided by server devices. However, while discussed as being provided by server devices, one of skill in the art in possession of the present disclosure will recognize that computing systems provided in the networked system 200 may include any computing systems that may be configured to operate similarly as the computing systems 202a-202c discussed below. In the illustrated embodiment, each of the computing systems may be coupled to a network 204 that may be provided by a Local Area Network (LAN), the Internet, combinations thereof, and/or any other networks that would be apparent to one of skill in the art in possession of the present disclosure.

In the illustrated embodiment, a management system 206 is also coupled to the network 204. In an embodiment, the management system 206 may be provided by the IHS 100 discussed above with reference to FIG. 1, and/or may include some or all of the components of the IHS 100, and in specific examples may be provided by one or more management server devices that may be configured to perform management functionality for the computing systems 202a-202c. In the illustrated embodiment, one or more network-attached devices 208 are also coupled to the network 204. In an embodiment, the network-attached device(s) 208 may be provided by a variety of different network-attached devices that are accessible to the computing systems 202a-202c via the network 204, and in specific examples below are discussed as being provided by one or more Non-Volatile Memory express (NVMe) storage devices that may be configured to provide a network-attached storage system for any or all of the computing systems 202a-202c. However, while a specific networked system 200 has been illustrated and described, one of skill in the art in possession of the present disclosure will recognize that the platform root-of-trust system of the present disclosure may be utilized with a variety of components and component configurations, and/or may be provided in a variety of computing system/network configurations, while remaining within the scope of the present disclosure as well.

Figure 3A:
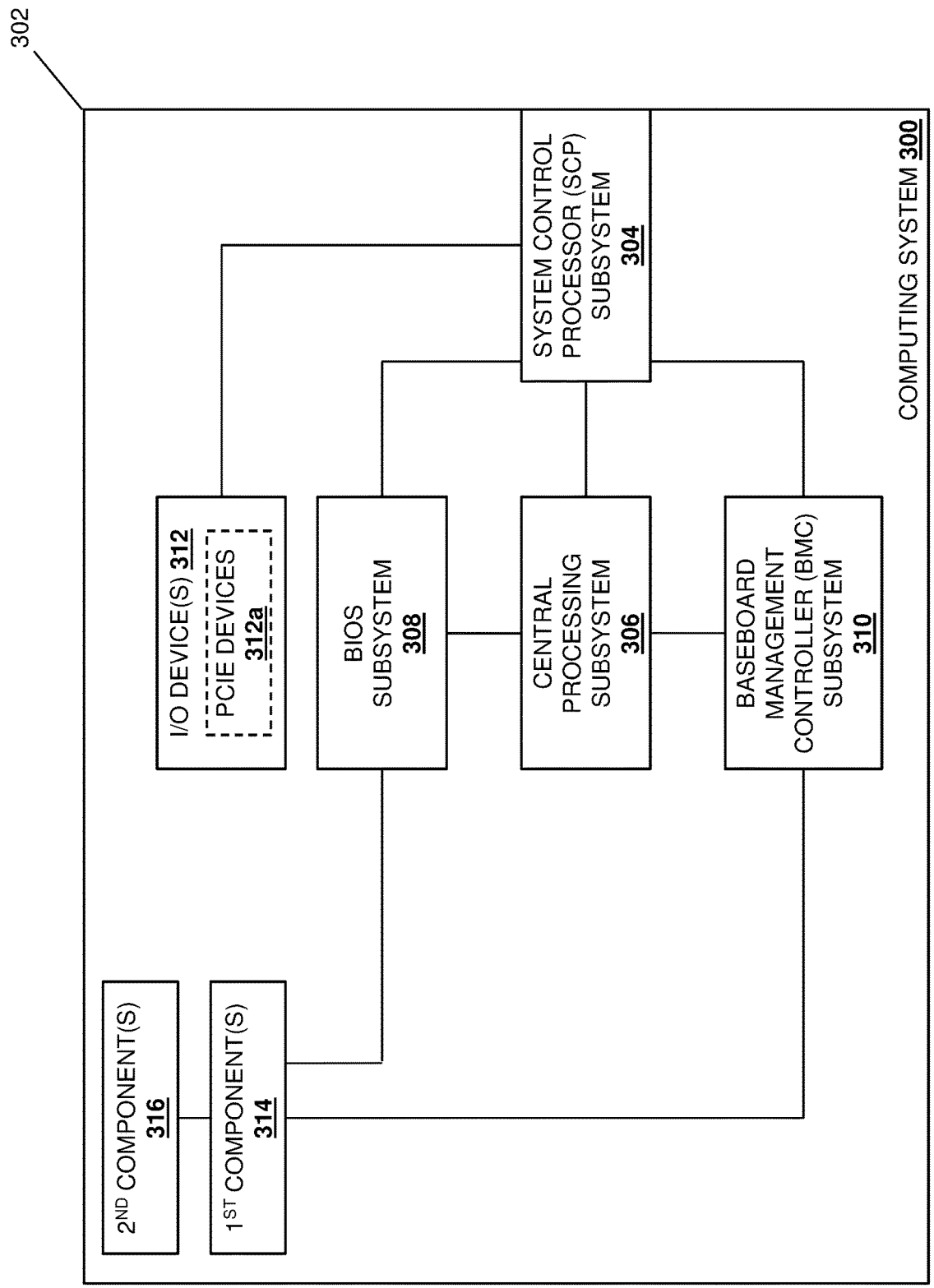
FIG. 3A is a schematic view illustrating an embodiment of a computing system that may be included in the networked system of FIG. 2 and that may utilize the communication system personality provisioning system of the present disclosure.

Referring now to FIG. 3A, an embodiment of a computing system 300 is illustrated that may provide any or all of the computing systems 202a-202c discussed above with reference to FIG. 2. As such, the computing system 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing system 300 discussed below may be provided by other computing system that are configured to operate similarly as the computing system 300 discussed below. In the illustrated embodiment, the computing system 300 includes a chassis 302 that houses the components of the computing system 300, only some of which are illustrated below.

For example, the chassis 302 may house a communication system that, in the illustrated embodiments discussed below, is provided by System Control Processor (SCP) subsystem 304 that is provided according to the teachings of the present disclosure to perform the communication system platform provisioning functionality that is discussed in further detail below. In some examples, the SCP subsystem 304 may be conceptualized as an "enhanced" SmartNIC device that may be configured to perform functionality that is not available in conventional SmartNIC devices such as, for example, the platform root-of-trust functionality described by the inventors of the present disclosure in U.S. patent application Ser. No. 17/027,835, filed on Sep. 22, 2020, the disclosure of which is incorporated herein by reference in its entirety. However, while the communication system upon which personalities are provisioned according to the teachings of the present disclosure is illustrated and described as an enhanced SmartNIC device provided by an SCP subsystem, one of skill in the art in possession of the present disclosure will appreciated that the communication system personality provisioning functionality described herein may be enabled on otherwise conventional SmartNIC devices while remaining within the scope of the present disclosure as well.

In an embodiment, the SCP subsystem 304 may be provided by the IHS 100 discussed above with reference to FIG. 1 and/or may include some or all of the components of the IHS 100. In specific examples, the SCP subsystem 304 may be provided as an SCP card that is configured to connect to a slot on a motherboard in the chassis 302. In other examples, the SCP subsystem 304 may be integrated into a motherboard in the chassis 302. In yet other examples the SCP subsystem 304 may be a separate/co-motherboard circuit board that is connected to a motherboard in the chassis 302 (e.g., a two-part motherboard having a first portion that enables conventional motherboard functionality, and a second portion that enables the SCP functionality discussed below). However, while a few specific examples are provided, one of skill in the art in possession of the present disclosure will appreciate that the SCP subsystem 304 may be provided in the computing system 300 in a variety of manners that will fall within the scope of the preset disclosure.

The chassis 302 may also house a central processing system 306 that is coupled to the SCP subsystem 304 (e.g., via a Peripheral Component Interconnect express (PCIe) interface), and which may include the processor 102 discussed above with reference to FIG. 1, a Central Processing Unit (CPU) such as a x86 host processor, and/or by a variety of other processing components that would be apparent to one of skill in the art in possession of the present disclosure. The chassis 302 may also house a computing system Basic Input/Output System (BIOS) subsystem 308 that is coupled to the SCP subsystem 304 (e.g., via a PCIe interface) and the central processing system 306, and that one of skill in the art in possession of the present disclosure will recognize as being provided by firmware that is configured to perform hardware initialization for the computing system 300 during a boot process (e.g., power-on startup operations) or other initialization process known in the art, as well as runtime services for operating systems and/or other applications/programs provided by the computing system 300. Furthermore, while described as a computing system BIOS subsystem, one of skill in the art in possession of the present disclosure will recognize that the computing system BIOS subsystem 308 may be replaced with a computing system Universal Extensible Firmware Interface (UEFI) subsystem, which one of skill in the art in possession of the present disclosure will recognize defines a software interface between an operating system and firmware in the computing system 300, and that was provided to replace computing system BIOS subsystems (while supporting legacy BIOS services).

In the illustrated embodiment, the chassis 302 may also house a Baseboard Management Controller (BMC) subsystem 310 that is coupled to the SCP subsystem 304 (e.g., via a sideband interface), and which one of skill in the art in possession of the present disclosure will recognize as being configured to manage an interface between system management software in the computing system 300 and hardware in the computing system 300, as well as perform other BMC operations that would be apparent to one of skill in the art in possession of the present disclosure. The chassis 302 may also house (or provide a coupling for) one or more Input/Output (I/O) devices 312 that are coupled to the SCP subsystem 304 (e.g., via a PCIe interface). As such, one of skill in the art in possession of the present disclosure will recognize that the I/O device(s) 312 may be housed in the chassis 302 and connected to an internal connector (e.g., on a motherboard in the chassis 302), or may be provided external to the chassis 302 and connected to an external connector (e.g., on an outer surface the chassis 302). As illustrated in FIG. 3A, the I/O device(s) 312 may include one or more Peripheral Component Interconnect express (PCIe) devices 312a (as the I/O device(s) 312 or in addition to other I/O device(s)). For example, the PCIe device(s) 312a may include NVMe storage devices that are house in the chassis 302 (i.e., and connected to an internal connector on a motherboard in the chassis 302), or that are external to the chassis 302 (i.e., and connected to an external connector on an outer surface of the chassis 302). However, while particular I/O devices and/or PCI devices have been described, one of skill in the art in possession of the present disclosure will recognize that a variety of other I/O devices will fall within the scope of the present disclosure as well.

Figure 3B:
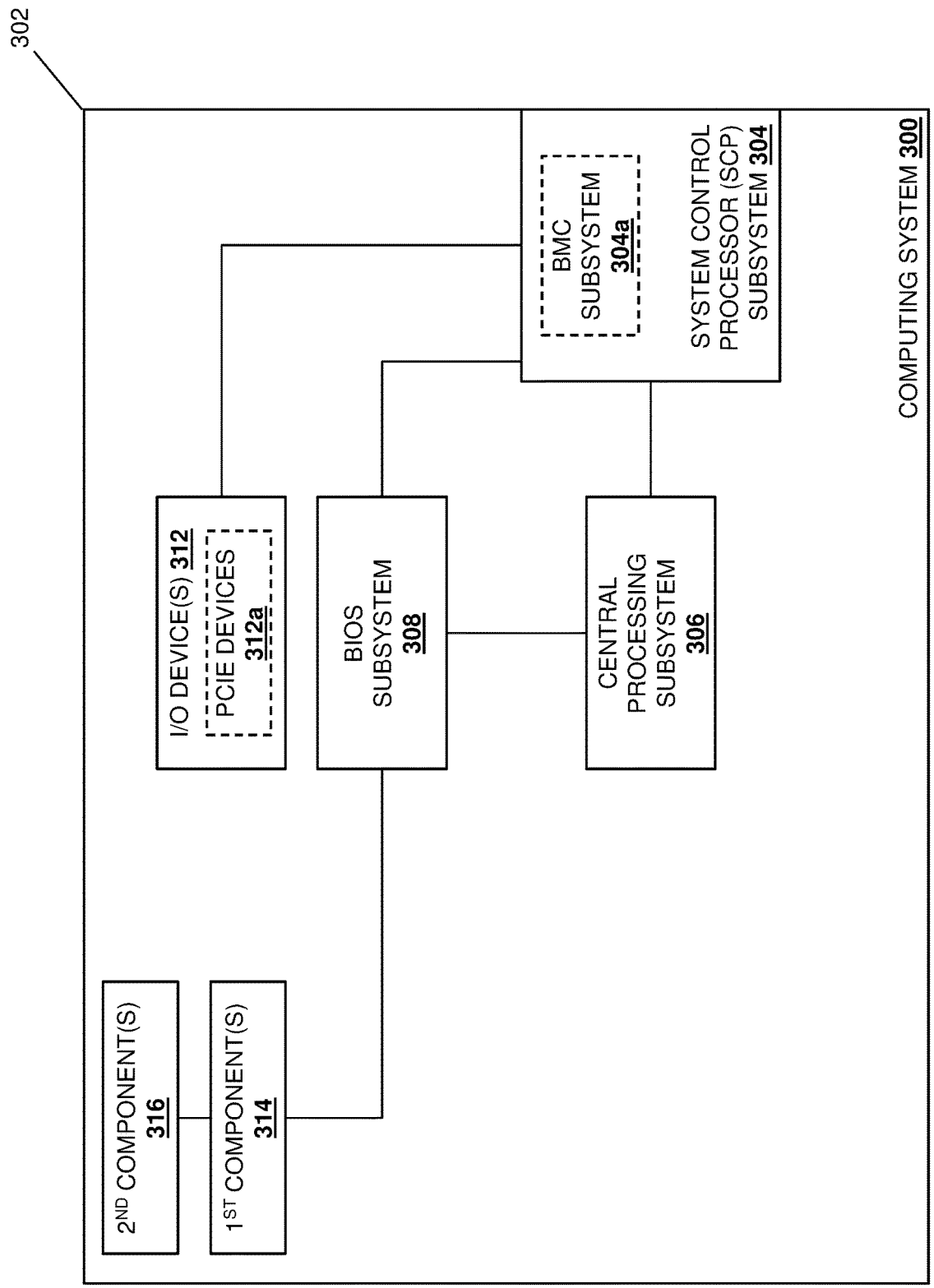
FIG. 3B is a schematic view illustrating an embodiment of a computing system that may be included in the networked system of FIG. 2 and that may utilize the communication system personality provisioning system of the present disclosure.

The chassis 302 may also house one or more first components 314 that are coupled to each of the BIOS subsystem 308 and the BMC subsystem 310, and one or more second components 316 that are coupled to at least one of the first components 314. In the specific examples provided below, the first component(s) 314 and/or second component(s) 316 may include a Complex Programmable Logic Device (CPLD), a power system, and/or any of a variety of computing system components known in the art. However, while a specific computing system 300 has been illustrated, one of skill in the art in possession of the present disclosure will recognize that computing systems (or other devices operating according to the teachings of the present disclosure in a manner similar to that described below for the computing system 300) may include a variety of components and/or component configurations for providing conventional computing system functionality, as well as the functionality discussed below, while remaining within the scope of the present disclosure as well. For example, FIG. 3B illustrates an embodiment of the computing system 300 in which the BMC subsystem 310 described above with reference to FIG. 3A is omitted, and the SCP subsystem 304 is configured (e.g., as an "enhanced" SmartNIC device) to provide a BMC subsystem 304a that performs the functionality of the BMC subsystem 310 in FIG. 3A.

Figure 4:
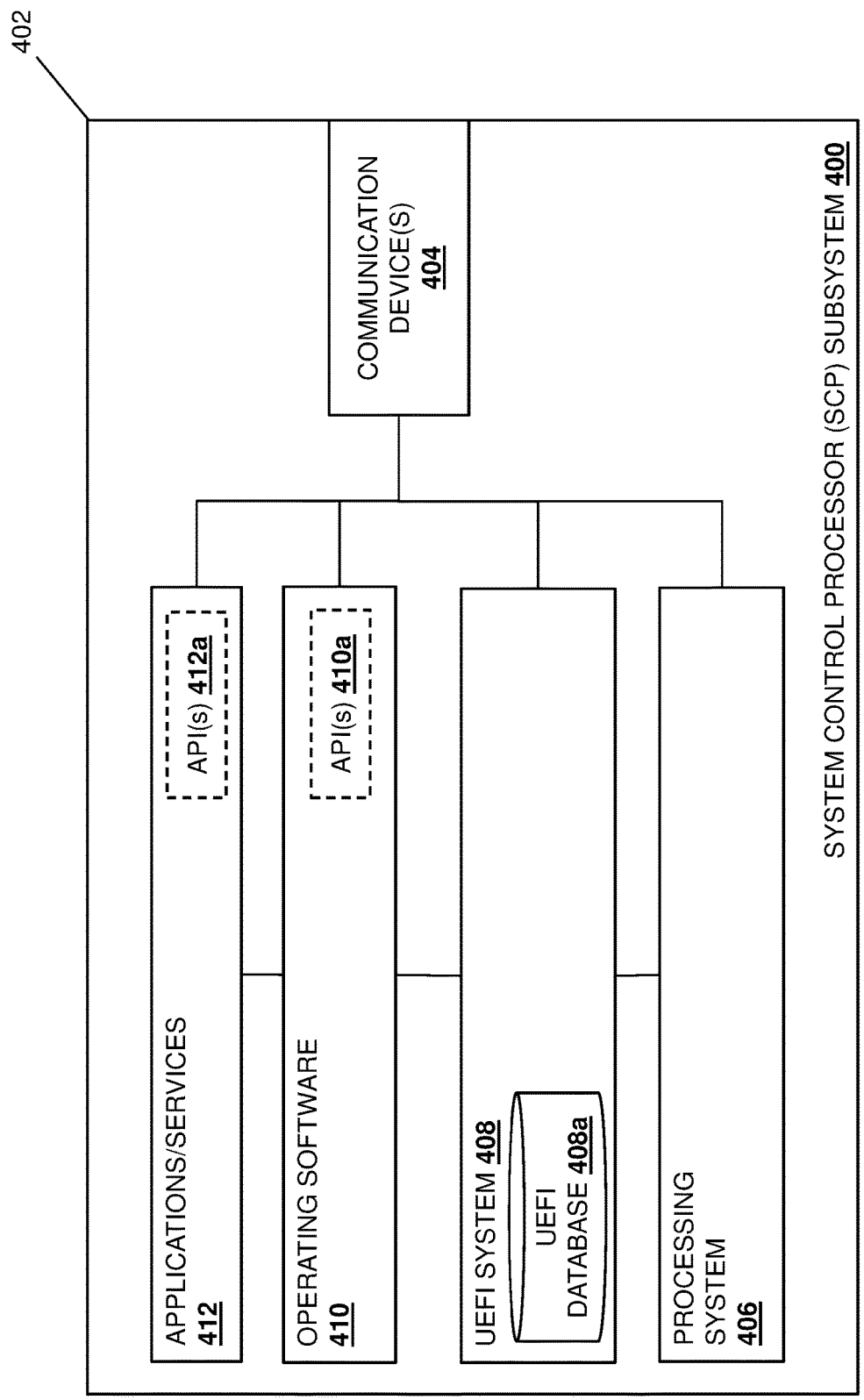
FIG. 4 is a schematic view illustrating an embodiment of a System Control Processor (SCP) subsystem that may be included in the computing device of FIGS. 3A or 3B, and that may provide the communication system personality provisioning system of the present disclosure.

Referring now to FIG. 4, an embodiment of an SCP subsystem 400 is illustrated that may provide the SCP subsystem 304 discussed above with reference to FIGS. 3A and 3B. As such, the SCP subsystem 400 may be provided by the IHS 100 discussed above with reference to FIG. 1 and/or may include some or all of the components of the IHS 100. Furthermore, in some specific examples, the SCP subsystem may be provided as an SCP card, may be integrated into a motherboard, or may be provided as a separate/co-motherboard circuit board. In other specific examples, the SCP subsystem (e.g., an "enhanced" SmartNIC device) may be replaced by an otherwise conventional SmartNIC device that has been configured to perform the communication system personality provisioning functionality discussed below. However, while illustrated and discussed as being provided in different manners in a computing system 400, one of skill in the art in possession of the present disclosure will recognize that the functionality of the SCP subsystem 400 discussed below may be provided by other communications systems that are configured to operate similarly as the SCP subsystem 400 discussed below.

In the illustrated embodiment, the SCP subsystem 400 includes a chassis 402 (e.g., a circuit board) that supports the components of the SCP subsystem 400, only some of which are illustrated below. For example, the chassis 302 may support one or more communication devices 404 that may include a Network Interface Controller (NIC) device and/or other communication devices that one of skill in the art in possession of the present disclosure will recognize are configured to connect the SCP subsystem 400 to the network 204, as well as other communication device(s) and/or components that connect to the components in the computing system 300 discussed above with reference to FIGS. 3A and 3B, and that connect to the components of the SCP subsystem 400 discussed below.

For example, the chassis 402 may support an SCP processing system 406 that is coupled to the communication device(s) 404. In the specific examples provided below, the SCP processing system 406 may be provided by an ARM Central Processing Unit (CPU)-based architecture including one or more ARM processing cores, and/or other processing components that would be apparent to one of skill in the art in possession of the present disclosure. Furthermore, the chassis 402 may also support an SCP UEFI system 408 that is coupled to the processing system 406 and the communication device(s) 404, and that includes an SCP UEFI database 408a that may be provided by a Serial Peripheral Interface (SPI) flash storage device and/or other storage devices that would be apparent to one of skill in the art in possession of the present disclosure. In the specific examples discussed below, the SCP UEFI system 408 may be configured to be Server Base System Architecture (SBSA)-compliant in order to, for example, allow the SCP UEFI system 408 to communicate with the operating software 410 (e.g., via Application Programming Interfaces (APIs)) discussed in further detail below. However, while a UEFI system 408 described, other BIOS and/or other initialization systems may be utilized with the SCP subsystem 400 while remaining within the scope of the present disclosure as well. Furthermore, the SCP UEFI system 408 may be configured to perform UEFI secure boot operations, with the SCP UEFI database 408a securely storing information utilized in those UEFI secure boot operations using any of a variety of techniques that would be apparent to one of skill in the art in possession of the present disclosure. As will be appreciated by one of skill in the art in possession of the present disclosure, the SCP processing system 406 and the SCP UEFI system 408 may provide SCP firmware for the SCP subsystem 400 that may be "owned" or otherwise controlled by an SCP subsystem provider and, as discussed below, may be secured to prevent any non-secured access (e.g., via the authentication information discussed below.)

The chassis 402 may also support operating software 410 that is coupled to the UEFI system 408 and the communication device(s) 404. In the specific examples provided below, the operating software 410 may be provided by an operating system, a hypervisor system, combinations thereof, and/or other operating software that would be apparent to one of skill in the art in possession of the present disclosure. Furthermore, the operating software 410 may include one or more Application Programming Interfaces (APIs) 410a that, as discussed below, may be configured to allow for communication between the operating software 410 and external entities (e.g., external to the SCP subsystem 400) via the communication device(s) 404. The chassis 402 may also support applications/services 412 that is coupled to the operating software 412 and the communication device(s) 404. In the specific examples provided below, the applications/services 412 may be provided by applications, services, combinations thereof, and/or other software for performing enhanced communication system functionality that would be apparent to one of skill in the art in possession of the present disclosure. Furthermore, the applications/services 412 may include one or more APIs 412a that, as discussed below, may be configured to allow for communication between the applications/services 412 and external entities (e.g., external to the SCP subsystem 400) via the communication device(s) 404. While illustrated and discussed as separate, one of skill in the art in possession of the present disclosure will appreciate that the operating software and applications/services discussed below may be integrated (i.e., the applications/services may be embedded in the operating software) while remaining within the scope of the present disclosure.

As discussed above, the operating software 410 and/or the applications/services 412 provided on the SCP subsystem 400 may operate to perform particular functionality that may provide a "personality" for the SCP subsystem 400 and, as discussed below, that personality may be modified by authorized entities according to the teachings of the present disclosure (e.g., by entities who have been provided the authentication information discussed below). As such, in some examples, a computing system provider (e.g., a server device provider) may associate the SCP subsystem 400 with a single Stock Keeping Unit (SKU), while enabling different personalities on that SCP subsystem 400 that provide different functionalities for the computing systems/server devices in which they are utilized. However, while a specific SCP subsystem 400 has been illustrated and described, one of skill in the art in possession of the present disclosure will recognize that SCP subsystems (or other devices operating according to the teachings of the present disclosure in a manner similar to that described below for the SCP subsystem 400) may include a variety of components and/or component configurations for providing the functionality discussed below while remaining within the scope of the present disclosure as well.

Figure 5:
FIG. 5 is a flow chart illustrating an embodiment of a method for providing personalities on a communication system.

Referring now to FIGS. 5, an embodiment of a method 500 for provisioning personalities on a communication system is illustrated. As discussed below, the systems and methods of the present disclosure provide for the dynamic and secure provisioning of operating software and/or application(s)/service(s) on a communication system in a computing system. For example, the communication system personality provisioning system of the present disclosure includes a communication system that is included in a computing system and that is coupled to a management system. The communication system stores authentication information in a UEFI database of a UEFI system in the communication system. The communication system then receives a first operating software image and application(s)/service(s) from the management system, authenticates the first operating software image and application(s)/service(s) via first secure initialization operations performed by the UEFI system using the authentication information and, in response, installs the first operating software image and application(s)/service(s) on the communication system. The communication system subsequently receives a second operating software image and application(s)/service(s) from the management system, authenticates the second operating software image and application(s)/service(s) via second secure initialization operations performed by the UEFI system using the authentication information and, in response, installs the second operating software image and application(s)/service(s) on the communication system. As such, the provisioning of different personalities for a communication system is enabled without the need to involve the communication system provider, compromise security of the communication system and/or the computing system in which it is utilized, and/or provide multiple communication system options for the computing system.

The method 500 begins at block 502 where a communication system stores authentication information in a UEFI database that is part of a UEFI system that is included in the communication system. In an embodiment, at block 502, the SCP subsystem 304/400 may operate to store authentication information in the UEFI database 408a included in the UEFI system 408. For example, the authentication information stored in the UEFI database 408a may include public key(s) corresponding to private keys that, as discussed below, may be utilized to sign operating software images and/or applications/services, certificates (e.g., X.509 certificates) included with operating software images and/or applications/services, Key Exchange Key(s) (KEK(s)), and/or any other authentication information that would be apparent to one of skill in the art in possession of the present disclosure.

In one specific example and as part of the manufacture of the SCP subsystem 204/400, an SCP subsystem provider may configure the UEFI system 408 to perform UEFI secure boot operations, and may store public key(s), certificate(s), KEK(s), and/or other authentication information corresponding to "personalities" (e.g., operating software images and/or application(s)/service(s)) that will be enabled on the SCP subsystem 304/400, in the UEFI database 408a for use in the UEFI secure boot operations. In another specific example and as part of the provisioning of the SCP subsystem 204/400 in the computing system 202a/300, a computing system provider may configure the UEFI system 408 to perform UEFI secure boot operations, and may store public key(s), certificate(s), KEK(s), and/or other authentication information corresponding to "personalities" (e.g., operating software images and/or application(s)/service(s)) that will be enabled on the SCP subsystem 304/400, in the UEFI database 408a for use in the UEFI secure boot operations. As such, the SCP subsystem 304/400 may conform to industry-standard UEFI specifications for standard UEFI secure boot details, other UEFI specifications, SBSA specifications, and/or other specifications that one of skill in the art in possession of the present disclosure would recognize as providing the security functionality discussed below. However, while described as being provided by an SCP subsystem provider as part of the manufacture of the SCP subsystem 304/400, or by a computing system provider as part of the provisioning of the SCP subsystem 304/400 in the computing system 202a/300, one of skill in the art in possession of the present disclosure will appreciate that authentication information may be provided in the UEFI database 408a that is part of the UEFI system 408 included in the SCP subsystem 304/400 subsequent to the manufacture of the SCP subsystem 304/400 and/or subsequent to the provisioning of the SCP subsystem 304/400 in the computing system 202a/300 while remaining within the scope of the present disclosure as well.

The method 500 then proceeds to block 504 where the communication system receives an operating software image and application(s)/service(s). In an embodiment, at block 504, the SCP subsystem 304/400 may receive an operating software image and one or more applications/services. In an embodiment, the operating software image may be provided by an operating system image, a hypervisor system image, and/or any other operating software image that one of skill in the art in possession of the present disclosure will recognize may provide operating functionality for the SCP subsystem 304/400 (or a SmartNIC device or other communication system known in the art). Furthermore, in an embodiment, the one or more applications/services may be provided by any applications, services, and/or other software entities that enable specific functionality for the SCP subsystem 304/400 (or a SmartNIC device or other communication system known in the art). As discussed in further detail below, the operating software image and one or more applications/services received by the SCP subsystem 304/400 may be signed by private key(s), may include certificate(s), and/or may otherwise be provided according to an authentication technique that allows the operating software image and one or more applications/services to be authenticated as discussed below. As such, the combination of the operating software image and the one or more applications/services may be signed with a single private key or include a single certificate, or each of the operating software image and the one or more applications/services may be signed with a respective private key or include a respective certificate.

Figure 6A:
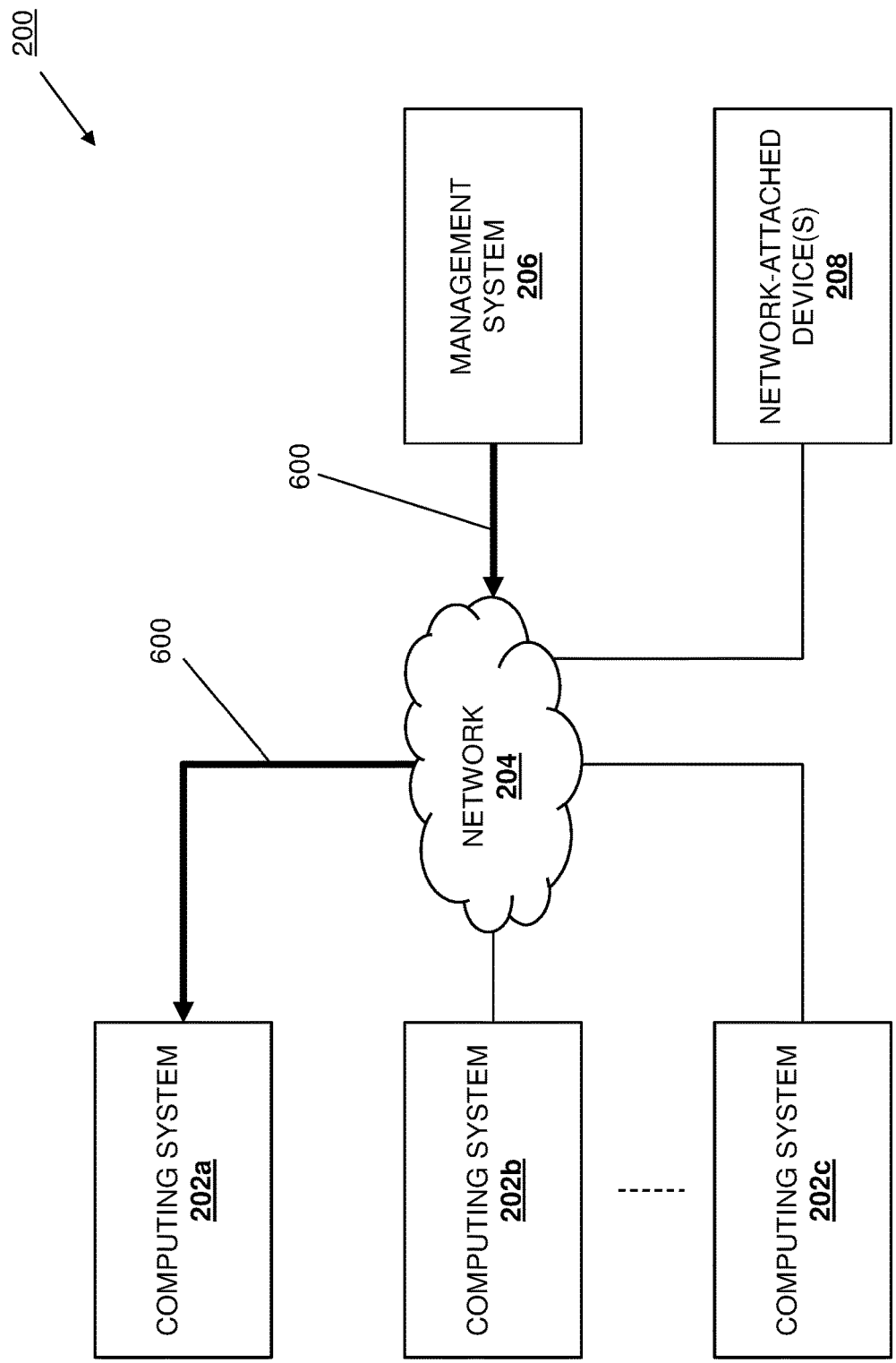
FIG. 6A is a schematic view illustrating an embodiment of the networked subsystem of FIG. 2 operating during the method of FIG. 5.

For example, with reference to FIG. 6A, in some embodiments of block 504 the management system 206 may perform operating software and application/service provisioning operations 600 that include transmitting an operating software image and one or more applications/services via the network 204 to the SCP subsystem 304/400. In a specific example, the management system 206 may be provided by a network-connected SCP management system that is configured to manage SCP subsystems via the network 204, and may provide the operating software image and one or more applications/services as part of management operations. In another specific example, the management system 206 may be provided by a network-connected Pre-boot Execution Environment (PXE) system that is configured to provision operating software and perform remote initialization operations via the network 204, and may provide the operating software image and one or more applications/services as part of those operations.

Figure 6B:
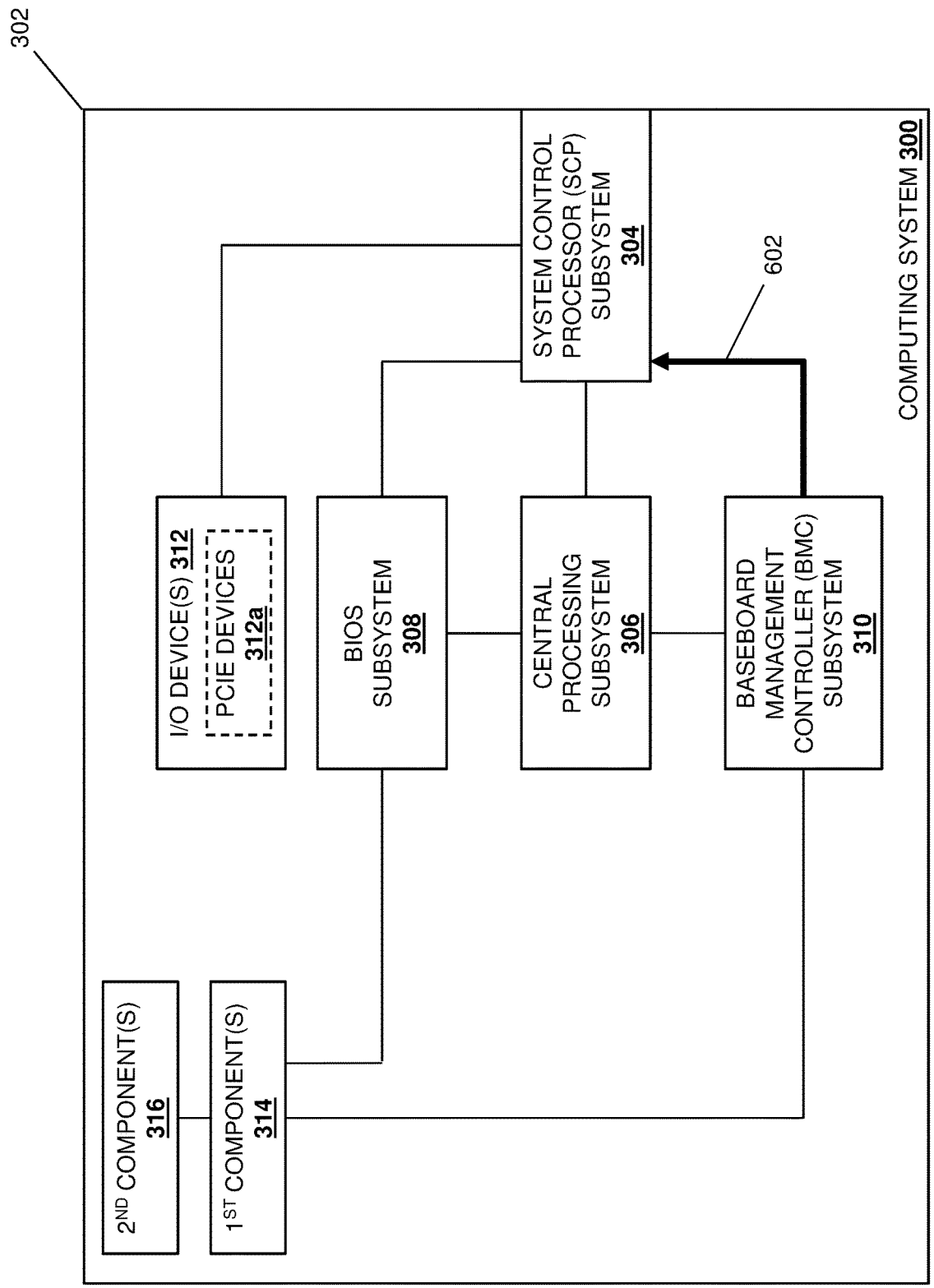
FIG. 6B is a schematic view illustrating an embodiment of the computing system of FIG. 3A operating during the method of FIG. 5.

In another example, with reference to FIG. 6B, in some embodiments of block 504 the management system may be provided by the BMC subsystem 310 that may perform operating software and application/service provisioning operations 602 that include transmitting an operating software image and one or more applications/services to the SCP subsystem 304/400. In a specific example, the BMC subsystem 310 may retrieve the operating software image and one or more applications/services from a Network File System (NFS) (e.g., via an out-of-band management channel available to the BMC subsystem 310), and provide the operating software image and one or more applications/services to the SCP subsystem 304/400. In another specific example, the BMC subsystem 310 may store multiple personalities for the SCP subsystem 304/400, and may operate at block 504 to provide one of those operating software images and one or more applications/services to the SCP subsystem 304/400. However, while several specific examples have been provided, one of skill in the art in possession of the present disclosure will appreciate that the operating system image and one or more applications/services may be provided to the SCP subsystem 304/400 by a variety of management systems while remaining within the scope of the present disclosure as well.

Figure 6C:
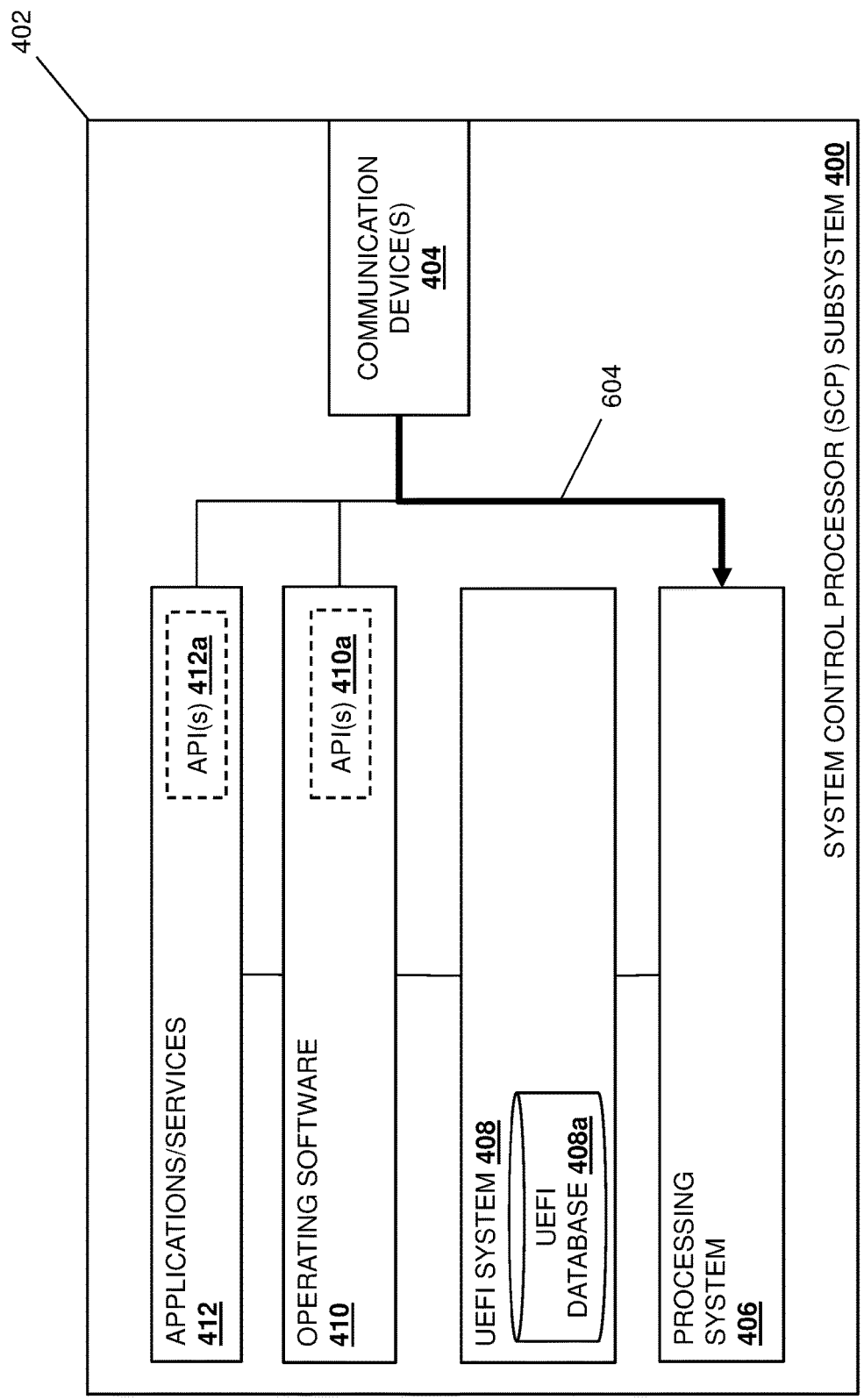
FIG. 6C is a schematic view illustrating an embodiment of the SCP subsystem of FIG. 4 operating during the method of FIG. 5.

As such, with reference to FIG. 6C, the processing system 406 in the SCP subsystem 304/400 may perform operating software and application/service receiving operations 604 to receive the operating system image and one or more applications/services via its communication device 404 at block 504. As will be appreciated by one of skill in the art in possession of the present disclosure, upon receiving the operating system image and the one or more applications/services at block 504, the processing system 406 in the SCP subsystem 304/400 may operate to store the operating system image and one or more applications/services in a storage subsystem (e.g., an embedded Multimedia Card (EMMC) storage device) that is included in the SCP system 304/400 (not illustrated). For example, code run by ARM processing cores in the processing system 406 of a SmartNIC device or other SCP subsystem may provide an engine that is responsible for accepting operating software and/or applications/services and storing them on an EMMC storage device or other accessible storage subsystem.

Figure 6D:
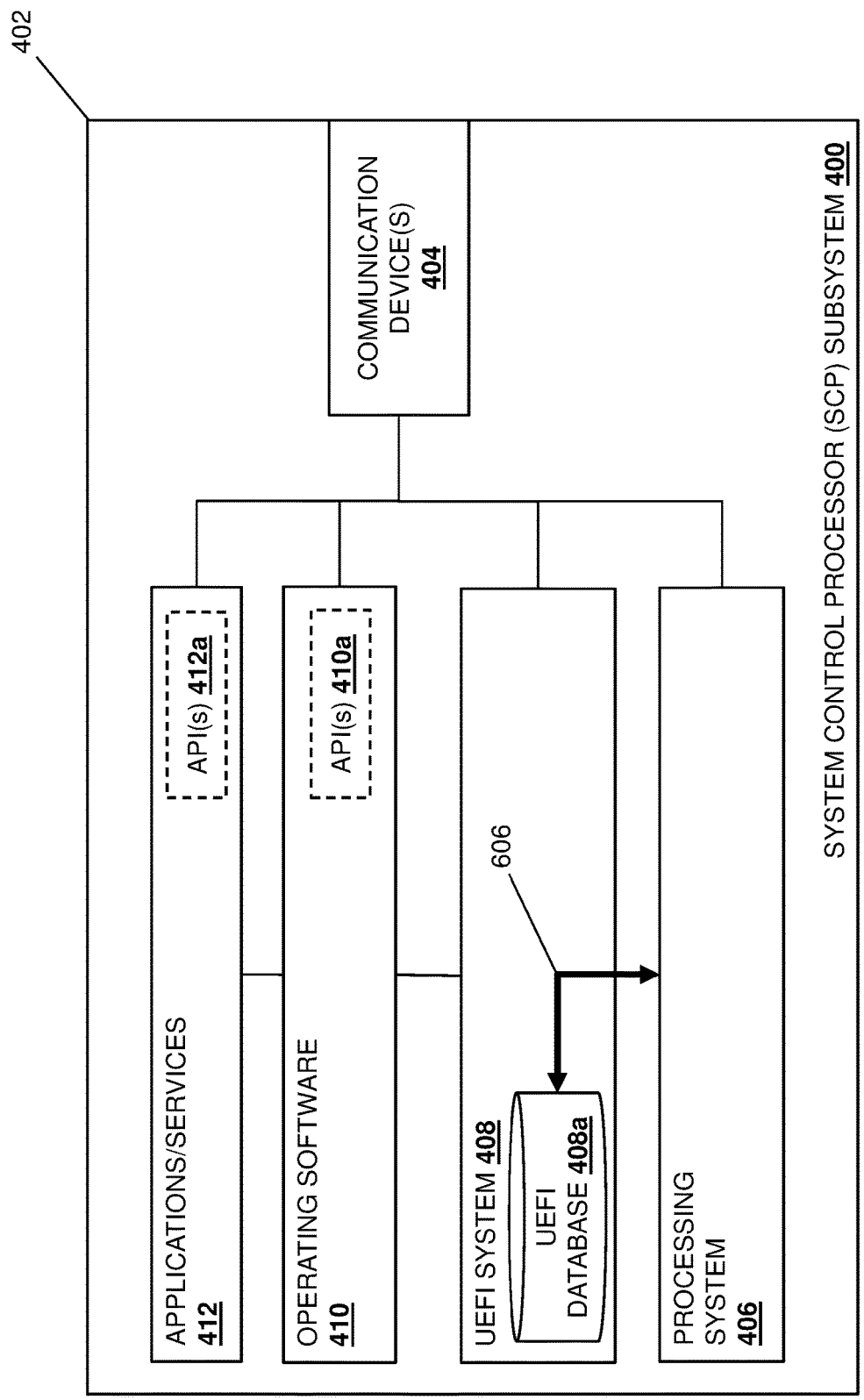
FIG. 6D is a schematic view illustrating an embodiment of the SCP subsystem of FIG. 4 operating during the method of FIG. 5.

The method 500 then proceeds to decision block 506 where it is determined whether the operating software image and application(s)/service(s) are authenticated. In an embodiment, at decision block 506, the SCP subsystem 304/400 may operate to authenticate whether the operating software image and the one or more applications/services received at block 504. With reference to FIG. 6D, at decision block 506, the processing system 406 may perform authentication operations 606 in order to authenticate the operating software image and the one or more applications/services received at block 504 by determining whether the operating software image and the one or more applications/services are authentic according to the authentication information that is stored in the UEFI database 408a. For example, the authentication operations 606 may be performed as part of UEFI secure boot operations subsequent to a power-on, reset, reboot, and/or other initialization of the computing system 202a/300 and/or SCP subsystem 304/400, and subsequent to receiving the operating software image and one or more applications/services. In a specific example, the authentication operations 606 performed by the processing system 406 at block decision block 506 may include using public key(s) stored in the UEFI database 408a to determine whether the operating software image and the one or more applications/services are signed with private key(s) corresponding to those public key(s) (i.e., determining whether the combination of the operating software image and the one or more applications/services is signed with a private key corresponding to a public key stored in the UEFI database 408*a*, determining whether each of the operating software image and the one or more applications/services is signed with a respective private key corresponding to a respective public key stored in the UEFI database 408*a*, etc.).

In another specific example, the authentication operations 606 performed by the processing system 406 at block decision block 506 may include using certificates stored in the UEFI database 408*a* to determine whether the operating software image and the one or more applications/services include a corresponding certificate that verifies their authenticity (i.e., determining whether the combination of the operating software image and the one or more applications/services includes a certificate corresponding to a certificate stored in the UEFI database 408*a*, determining whether each of the operating software image and the one or more applications/services includes a respective certificate corresponding to a respective certificate stored in the UEFI database 408*a*, etc.). However, while a few examples have been provided, one of skill in the art in possession of the present disclosure will appreciate that the operating software image and the one or more applications/services received at block 504 may be authenticated using a variety of authentication techniques that will fall within the scope of the present disclosure as well.

If, at decision block 506, it is determined that the operating software image and application(s)/service(s) are not authenticated, the method 500 proceeds to block 508 where the communication system ignores the operating software image and application(s)/service(s). In an embodiment, at block 508 and in response to determining at decision block 506 that the operating software image and the one or more applications/services received at block 504 are not authentic, the SCP subsystem 304/400 may ignore the operating software image and the one or more applications/services received at block 504. For example, at decision block 506 the processing system 406 may determine that the operating software image and the one or more applications/services received at block 504 have not been signed with private key(s) corresponding to public key(s) stored in the UEFI database 408*a*, do not include certificate(s) corresponding to certificate(s) stored in the UEFI database 408*a*, and/or otherwise cannot be authenticated and, in response, ignore the operating software image and the one or more applications/services and, in some cases, generate and display an error/warning message. As such, any operating software image and/or applications/services that cannot be authenticated will not be utilized to configure the SCP subsystem 304/400 with a corresponding personality, thus preventing the SCP subsystem from being provisioning with a personality by any unauthorized entity (e.g., an entity without a private key corresponding to a public key stored in the UEFI database 408*a*, an entity without a certificate corresponding to a certificate stored in the UEFI database 408*a*, etc.).

If, at decision block 506, it is determined that the operating software image and application(s)/service(s) are authenticated, the method 500 proceeds to block 510 where the communication system installs the operating software image and application(s)/service(s). In an embodiment, at block 510 and in response to determining that the operating software image and the one or more applications/services received at block 504 are authentic, the SCP subsystem 304/400 may install the operating software image and the one or more applications/services received at block 504. For example, at decision block 506 the processing system 406 may determine that the operating software image and the one or more applications/services received at block 504 have been signed with private key(s) corresponding to public key(s) stored in the UEFI database 408*a*, include certificate(s) corresponding to certificate(s) stored in the UEFI database 408*a*, and/or otherwise are authentic and, in response, may perform installation operations to install the operating software image and the one or more applications/services on the SCP subsystem 304/400.

Figure 6E:
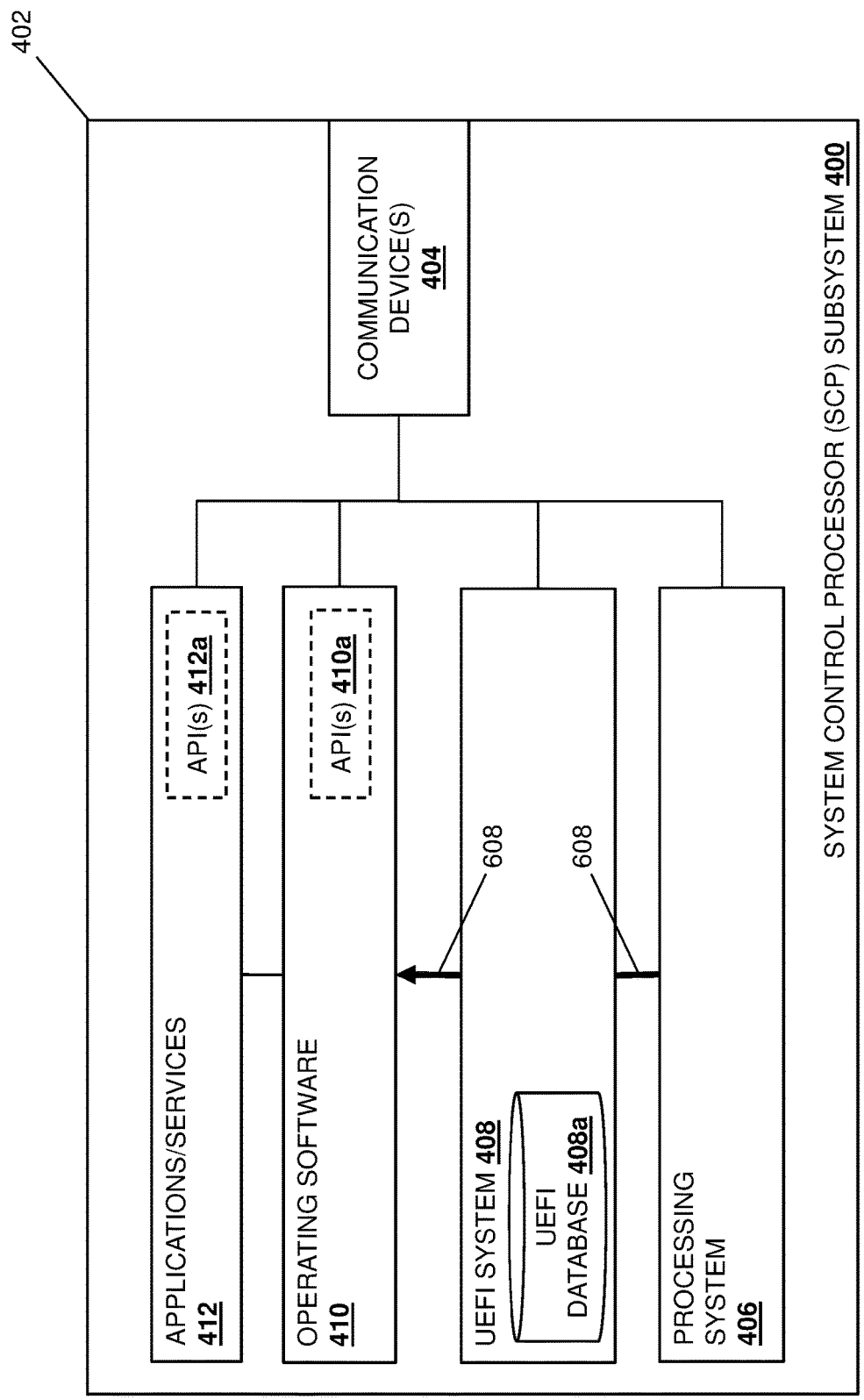
FIG. 6E is a schematic view illustrating an embodiment of the SCP subsystem of FIG. 4 operating during the method of FIG. 5.
Figure 6F:
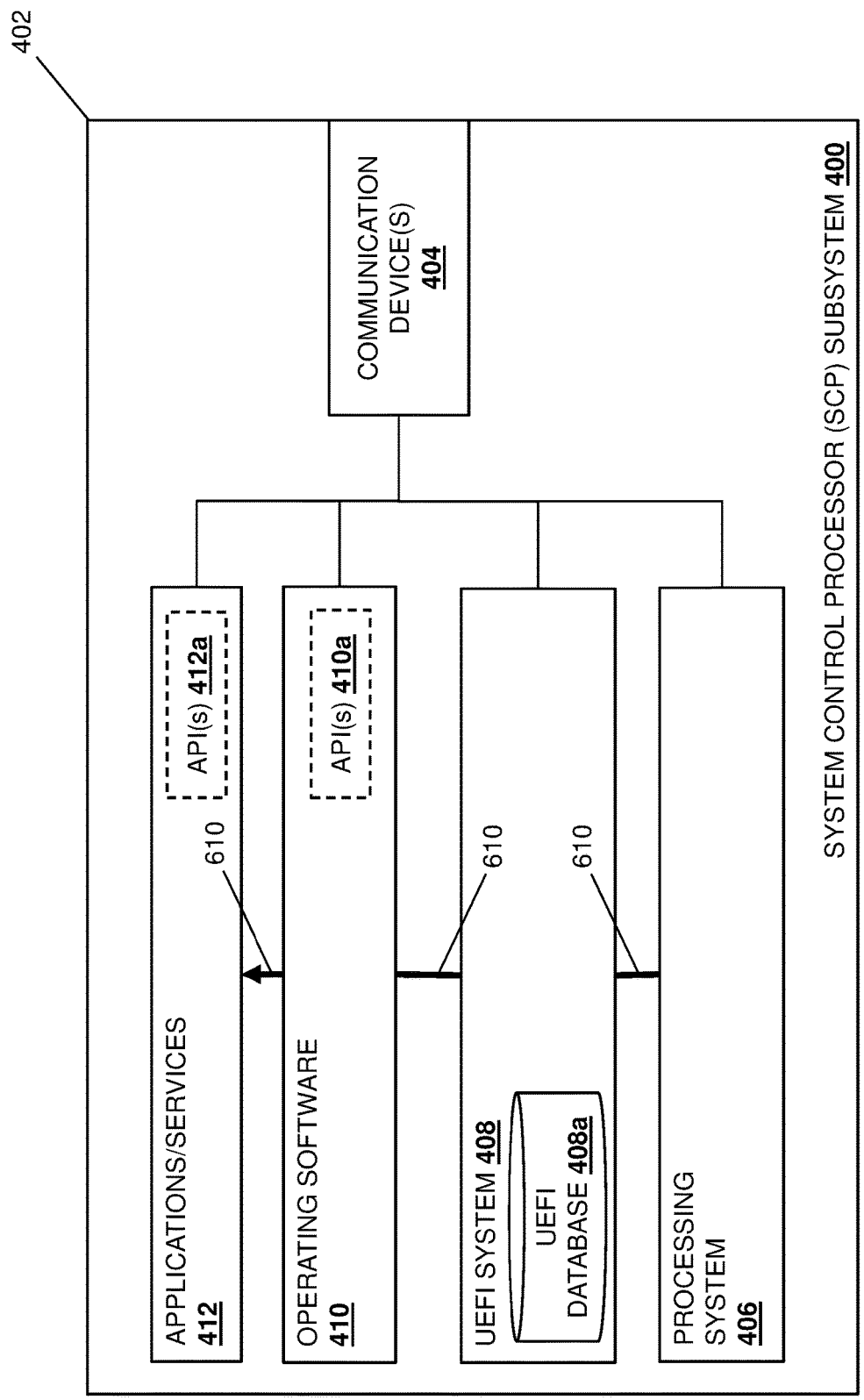
FIG. 6F is a schematic view illustrating an embodiment of the SCP subsystem of FIG. 4 operating during the method of FIG. 5.

For example, with reference to FIG. 6E, the processing system 406 may perform operating software image installation operations 608 in order to install the operating software image received at block 504 and authenticated at block 506 on the SCP subsystem 400 in order to provide the operating software 410 on the SCP subsystem 400. In a specific example and for the purposes of discussion below, the operating software installed on this first iteration of the method 500 may be a LINUX® operating system, although one of skill in the art in possession of the present disclosure will appreciate that other operating systems and/or hypervisor systems may be installed on the SCP subsystem 304/400 while remaining within the scope of the present disclosure as well. Similarly, with reference to FIG. 6F, the processing system 406 may perform application/service installation operations 610 in order to install the one or more applications/services received at block 504 and authenticated at block 506 on the SCP subsystem 400 in order to provide the applications/services 412 on the SCP subsystem 400. As discussed above, the operating software 410 and applications/services 412 operate to provide particular functionality for the SPC subsystem 304/400 that provides a "personality" for that SCP subsystem 304/400.

The method 500 then proceeds to block 512 where the communication system prevents data storage on the communication system without operating software authorization. In an embodiment, at block 512, the SCP subsystem 304/400 may operate to prevent the storage of data on the SCP subsystem 304/400 without operating software authorization. For example, at block 512 and following the installation of the operating software image and one or more applications/services, the processing system 406 may operate to lock any APIs that are provided in the SCP subsystem 304/400 and that allow for the storage of data on the SCP subsystem 304/400, which one of skill in the art in possession of the present disclosure will recognize may include locking a SPI flash API that allows the storage of data in the UEFI database 408*a* provided on a SPI flash storage device in the SCP subsystem 304/400, locking an embedded Multimedia Card (EMMC) API that allow the storage of data in an EMMC storage device in the SCP subsystem 304/400, and/or locking any other API that one of skill in the art in possession of the present disclosure will recognize may be utilized to store data on the SCP subsystem 304/400. As will be appreciated by one of skill in the art in possession of the present disclosure, the locking of APIs as discussed above may persist without an operating software authorization from the operating software 410 in the SCP subsystem 304/400, which prevents new personalities from being enabled for the SCP subsystem 304/400 without obtaining authorization from the operating software 304/400.

As such, in order to store a new authentication information (e.g., a new public key, certificate, KEK, etc.) in the UEFI database 408*a* subsequent to the installation of the operating system image and one or more applications/services on the SCP subsystem 304/400, or store a new operating software image and/or applications/services in the SCP subsystem 304/400 (e.g., on an EMMC storage device) subsequent to the installation of the operating system image and one or more applications/services on the SCP subsystem 304/400, the entity wishing to perform the corresponding storage operations must authenticate to the operating software 410. Following authentication, the operating software 410 may operate to unlock the APIs that were locked at block 512 such that data may be stored on the SCP subsystem 304/400 In a specific example, the addition/modification of new authentication information (e.g., a new public key, certificate, KEK, etc.) in the UEFI database 408*a* may require authenticated access to ARM processing cores in the processing system 406 via, for example, UEFI variables related to UEFI secure boot operations for the SRM processing cores. In another specific example, the addition/modification of new operating software image and/or applications/services in the SCP subsystem 304/400 (e.g., on an EMMC storage device) by the operating software (e.g., the operating software would like to update itself or add a new application/service) may be performed via OS administrative control operations.

In some embodiments, subsequent to block 512, a new personality may be provided on the SCP subsystem 304/400. For example, subsequent to the performance of block 512 on a first iteration of the method 500 (i.e., in which a LINUX® operating system was installed on the SCP subsystem 304/400 in the specific example above), a second iteration of the method 500 may be performed in which the method 500 returns to block 504 and proceeds as discussed above to change the personality provided on the SCP subsystem 304/400 on the first iteration of the method 500 with a new personality (e.g., an ESXio hypervisor system in this specific example provided below). As such, at block 504 on this second iteration of the method 500, the SCP subsystem 304/400 may receive an operating software image and one or more applications/services that provide the new personality for the SCP subsystem 304/400 and, similarly as discussed above, that operating software image and those one or more applications/services may be signed with private key(s) corresponding to public key(s) in the UEFI database 408. At block 506 on this second iteration of the method 500, the SCP subsystem 304/400 may then determine whether that operating system image and those one or more applications/services are authentic and, if not, may ignore that operating system image and those one or more applications/services are authentic.

However, if the SCP subsystem 304/400 determines that operating system image and those one or more applications/services are authentic, this second iteration of the method 500 proceeds to block 510 where the existing operating system image (e.g., that provides a LINUX® operating system as discussed above) and one or more applications/services are decommissioned (e.g., via a dedicated API), and the new operating system image (e.g., that provides an ESXio hypervisor system as discussed above) and one or more applications/services are installed on the SCP subsystem 304/400. Thus, the "new" operating software and "new" applications/services will operate to provide particular functionality for the SPC subsystem 304/400 that provides a different "personality" for that SCP subsystem 304/400 than was provided by the operating software 410 and the applications/services 412. Subsequently, at block 512 on this second iteration of the method 500, the SCP subsystem 304/400 may again prevent data storage on the SCP subsystem 304/400 without operating software authorization.

Thus, systems and methods have been described that provide for the dynamic and secure provisioning of operating software and/or application(s)/service(s) on an SCP subsystem in a computing system. For example, the SCP subsystem personality provisioning system of the present disclosure includes an SCP subsystem that is included in a computing system and that is coupled to a management system. The SCP subsystem stores authentication information in a UEFI database of a UEFI system in the SCP subsystem. The SCP subsystem then receives a first operating software image and application/service from the management system, authenticates the first operating software image and application/service via first secure initialization operations performed by the UEFI system using the authentication information and, in response, installs the first operating software image and application/service on the SCP subsystem. The SCP subsystem subsequently receives a second operating software image and application/service from the management system, authenticates the second operating software image and application/service via second secure initialization operations performed by the UEFI system using the authentication information and, in response, installs the second operating software image and application/service on the SCP subsystem. As such, the provisioning of different personalities for a SCP subsystem is enabled without the need to involve the SCP subsystem provider, compromise security of the SCP subsystem and/or the computing system in which it is utilized, and/or provide multiple SCP subsystem options for the computing system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A communication system personality provisioning system, comprising:
 a management system;
 a computing system; and
 a communication system that is included in the computing system and that is coupled to the management system, wherein the communication system is configured to:
 prevent storage of data on the communication system without operating software authorization;
 receive, from the management system, a second operating software image, at least one second application/service, and the operating software authorization;
 store, in response to receiving the operating software authorization, the second operating software image and at least one second application/service on the communication system;
 authenticate, via second secure initialization operations performed by a Unified Extensible Firmware Interface (UEFI) system that is included in the communication system and using authentication information stored in the UEFI system, the second operating software image and the at least one second application/service; and
 replace, in response to authenticating the second operating software image and the at least one second application/service, a first operating software image and at least one first application/service on the communication system with the second operating software image and the at least one second application/
service on the communication system.

2. The system of claim 1, wherein the management system includes a Baseboard Management Controller system that is included in the computing system and that is coupled to the communication system.

3. The system of claim 1, wherein the management system is coupled to the communication system via a network.

4. The system of claim 1, wherein the authentication information includes at least one public key, and wherein the authenticating the second operating software image and the at least one second application/service includes determining that the second operating software image and the at least one second application/service have been signed with at least one private key corresponding to the at least one public key.

5. The system of claim 1, wherein the first secure initialization operations and the second secure initialization operations include UEFI secure boot operations.

6. The system of claim 1, wherein the preventing the storage of data on the communication system without the operating software authorization includes:
locking each Application Programming Interface (API) that allows the storage of data on the communication system, wherein the operating software authorization is configured to provide for the unlocking of each API that allows the storage of data on the communication system.

7. A communication system, comprising:
a communication processing system; and
a communication memory system that is coupled to the communication processing system and that includes instructions that, when executed by the communication processing system, cause the communication processing system to provide a communication system personality provisioning engine that is configured to:
prevent storage of data on the communication system without operating software authorization;
receive, from a management system, a second operating software image, and at least one second application/service, and the operating software authorization;
store, in response to receiving the operating software authorization, the second operating software image and at least one second application/service on the communication system;
authenticate, via second secure initialization operations performed by a Unified Extensible Firmware Interface (UEFI) system that is included in the communication system and using authentication information stored in the UEFI system, the second operating software image and the at least one second application/service; and
replace, in response to authenticating the second operating software image and the at least one second application/service, a first operating software image and at least one first application/service on the communication system with the second operating software image and the at least one second application/
service on the communication system.

8. The communication system of claim 7, wherein the management system includes a Baseboard Management Controller system that is included in a chassis with the communication system.

9. The communication system of claim 7, wherein the management system is coupled to the communication system via a network.

10. The communication system of claim 7, wherein the authentication information includes at least one public key, and wherein the authenticating the second operating software image and the at least one second application/service includes determining that the second operating software image and the at least one second application/service have been signed with at least one private key corresponding to the at least one public key.

11. The communication system of claim 7, wherein the first secure initialization operations and the second secure initialization operations include UEFI secure boot operations.

12. The communication system of claim 7, wherein the first operating software image and at least one first application/service provide the communication system with a first personality having first functionality, and wherein the second operating software image and at least one second application/service provide the communication system with a second personality having second functionality that is different than the first personality having the first functionality.

13. The communication system of claim 7, wherein the preventing the storage of data on the communication system without the operating software authorization includes:
locking each Application Programming Interface (API) that allows the storage of data on the communication system, wherein the operating software authorization is configured to provide for the unlocking of each API that allows the storage of data on the communication system.

14. A method for providing personalities on a communication system, comprising:
preventing, by a communication system, storage of data on the communication system without operating software authorization;
receiving, by the communication system from a management system, a second operating software image, at least one second application/service, and the operating software authorization;
storing, by the communication system in response to receiving the operating software authorization, the second operating software image and at least one second application/service on the communication system;
authenticating, by the communication system via second secure initialization operations performed by a Unified Extensible Firmware Interface (UEFI) system that is included in the communication system and using authentication information stored in the UEFI system, the second operating software image and the at least one second application/service; and
replacing, by the communication system in response to authenticating the second operating software image and the at least one second application/service, a first operating software image and at least one first application/service on the communication system with the second operating software image and the at least one second application/service on the communication system.

15. The method of claim 14, wherein the management system includes a Baseboard Management Controller system that is included in a chassis with the communication system.

16. The method of claim 14, wherein the management system is coupled to the communication system via a network.

17. The method of claim 14, wherein the authentication information includes at least one public key, and wherein the authenticating the second operating software image and the at least one second application/service includes determining that the second operating software image and the at least one second application/service have been signed with at least one private key corresponding to the at least one public key.

18. The method of claim 14, wherein the first secure initialization operations and the second secure initialization operations include UEFI secure boot operations.

19. The method of claim 14, wherein the first operating software image and at least one first application/service provide the communication system with a first personality having first functionality, and wherein the second operating software image and at least one second application/service provide the communication system with a second personality having second functionality that is different than the first personality having the first functionality.

20. The method of claim 19, wherein the preventing the storage of data on the communication system without the operating software authorization includes:
   locking each Application Programming Interface (API) that allows the storage of data on the communication system, wherein the operating software authorization is configured to provide for the unlocking of each API that allows the storage of data on the communication system.

* * * * *